April 14, 1970    H. C. STRINGFIELD    3,506,356
METHOD AND DEVICE FOR PRODUCING A SUBSTANTIALLY STATIONARY
IMAGE OF SUCCESSIVE SIMILAR AREAS ON A RUNNING WEB
Filed Aug. 11, 1966    7 Sheets-Sheet 1

INVENTOR.
HORACE C. STRINGFIELD

BY

ATTORNEYS

April 14, 1970     H. C. STRINGFIELD     3,506,356
METHOD AND DEVICE FOR PRODUCING A SUBSTANTIALLY STATIONARY
IMAGE OF SUCCESSIVE SIMILAR AREAS ON A RUNNING WEB
Filed Aug. 11, 1966     7 Sheets-Sheet 2

INVENTOR.
HORACE C. STRINGFIELD

BY

ATTORNEYS

*INVENTOR.*
HORACE C. STRINGFIELD
BY

ATTORNEYS

April 14, 1970 H. C. STRINGFIELD 3,506,356
METHOD AND DEVICE FOR PRODUCING A SUBSTANTIALLY STATIONARY
IMAGE OF SUCCESSIVE SIMILAR AREAS ON A RUNNING WEB
Filed Aug. 11, 1966 7 Sheets-Sheet 4

INVENTOR.
HORACE C. STRINGFIELD

BY

ATTORNEYS

April 14, 1970   H. C. STRINGFIELD   3,506,356
METHOD AND DEVICE FOR PRODUCING A SUBSTANTIALLY STATIONARY
IMAGE OF SUCCESSIVE SIMILAR AREAS ON A RUNNING WEB
Filed Aug. 11, 1966   7 Sheets-Sheet 6

INVENTOR.
HORACE C. STRINGFIELD

BY

ATTORNEYS

FIG-22

3,506,356
METHOD AND DEVICE FOR PRODUCING A SUBSTANTIALLY STATIONARY IMAGE OF SUCCESSIVE SIMILAR AREAS ON A RUNNING WEB

Horace C. Stringfield, Pompton Lakes, N.J., assignor to National Laboratories & Manufacturing Corporation, a corporation of New Jersey
Continuation-in-part of application Ser. No. 175,138, Feb. 23, 1962. This application Aug. 11, 1966, Ser. No. 571,916
Int. Cl. G01p 3/40
U.S. Cl. 356—24
11 Claims

ABSTRACT OF THE DISCLOSURE

A method for inspecting running webs by presenting a succession of apparently stationary images to an observer. In one form an apparatus is utilized having a frame with a plurality and preferably two mirrors or reflective surfaces mounted on a drum within the frame. The mirrors on the drum rotate with the drum so that the mirrors are adapted to be successively positioned in optical alignment between the observer and the web. The mirrors are individually mounted on the drum on their own axis. The apparatus includes a mechanism for rotating and then positioning the mirrors so that at least one mirror is always optically aligned between the web and the observer. The mirror which is in optical alignment between the observer and the web is rotated about its own axis in timed relation to the running web to present to the observer an apparently stationary image. A method of scanning a running web of material wherein a plurality of individual mirrors are revolved and positioned successively so that at least one is always optically aligned between the observer and the web. The mirror which is so optically aligned is rotated about its own axis in timed relation to the web to present a stationary image to the observer.

---

It is to be understood that the above abstract of disclosure is submitted in compliance with the requirements of the United States Patent Office, Rule 72(B) Rules of Practice in patent cases and is not to be used in the construction of or as limiting the scope of the invention hereinafter defined in the appended claims.

This application is a continuation-in-part of my application, Ser. No. 175,138, filed Feb. 23, 1962 and my application Ser. No. 464,152 filed June 15, 1965. Both applications are now abandoned.

This invention relates to an improved method of visually inspecting a running web of material and an inspection apparatus for visually inspecting a running web of material. More particularly, this invention is related to an improved method and inspection apparatus utilizing a minimum number of mirrors for continuously scanning a running web of material so as to optically "stop" a running web of material and permit its inspection.

In many industries it is desirable and necessary to inspect a moving web of material. In such instances the web should be inspected while it is moving, because the web is subsequently wound upon a roller and unless the web is inspected while it is moving, the web must be unwound from the roll so that it can be inspected. The desirability of inspecting a moving web arises in many industries. For example, in the printing industry, a web is run between an impression roll and a printing roll so as to print a repetitive number of impressions on the moving web. An inspection means is required so that these repeating impressions can be observed to insure that the impressions are properly aligned and registered on the material. Another example where such devices are necessary is the sheet metal industry where manufacturers frequently form their sheet metal in web form and subsequently wind such material on a supply roll. It is desirable to be able to inspect the moving sheet metal for various types of defects before it is wound on the roll. In the above-described examples the web material is generally passed through a series of rollers at a high speed, which makes it virtually impossible for the naked eye to observe and inspect impressions or defects on the moving web of material.

There are machines in widespread public use and in the prior art patents such as United States Patents 2,686,455 and 2,155,013 that will permit the inspection and observation of moving webs of material. The most successful of these prior devices have utilized the well-known principle that if a mirror moves in synchronism or in timed relation with a moving web, one who is looking into the mirror will see a stationary or slowly moving image and will be given the impression that the moving web is standing still or moving slowly.

It will be understood that the impressions on a moving printed web are repetitive and that the mirrors in the devices under consideration are constructed and arranged so that each successive impression is scanned or tracked by the mirrors. Thus, the mirror arrangement must be such that when one mirror completes scanning the web, another mirror will replace the first mirror in the scanning process and will be in a position to scan the next successive impression. Unless there is continuous scanning of the moving web by the mirrors, the quality of the image will suffer. Obviously, unless the mirrors continuously scan the moving web, the image will be intermittent to the observer and the device cannot serve its ultimate purpose and function of permitting accurate quality control of a moving web of material.

The most popular inspection device of this character is one wherein a plurality of mirrors are mounted on a multi-sided cylinder and wherein the cylinder rotates in timed relationship with the moving web. In this type of device the individual mirrors, one at a time, scan or track the moving web to permit constant and continuous observation of a stationary image so that the observer can inspect the moving printed web to insure proper alignment and registration of the printed impression and to detect flaws on the moving web. There are several different forms of devices of this general description commercially available at this time and they have proved to be excellent devices from the standpoint of observation and inspection.

The method utilized in this type of device is for the mirror to be positioned on a periphery of the drum such that when the drum is rotated in timed relation to the running web the mirrors will successively scan the running web.

One difficulty with the multi-sided cylinder type of machine is that it has been found necessary to mount as many as fifteen mirrors on the drum. The reason for such a large number of mirrors is that the scanning angle obtained by a multi-sided cylinder is determined by the number of mirrors on the drum. The greater the number of mirrors on the drum the smaller the scanning angle. However, in any reflective following of an area of straight web, there is an apparent tilting of the image, owing to the changing angle at which the line of sight intersects the web. This tilting effect is related to the scanning angle so that the smaller the scanning angle, the less tilting effects will be observed. In order to reduce the tilting effect to a level that can be tolerated at least fifteen mirrors are needed on the multi-sided cylinder.

Another of the disadvantages of the multi-sided cylinder type of machine is the substantial cost of the individual mirrors. In addition to the cost of the mirrors, a second cost problem with this general type of machine is the fact that the sides of the multi-sided cylinder must be very carefully manufactured so that each side or face of the cylinder is identical with the remaining faces of the cylinder. Achievement of this result requires a very careful manufacturing process and generally involves a special grinding process which is a time consuming, painstaking task that must be done with the utmost care and involves great manufacturing skills.

A functional disadvantageous feature of the multi-sided cylinder type of machine occurs because of an inherent error introduced in such machines. The error that is caused by the difference in distance between the center and edges of any one mirror from the center of the drum on which it is mounted. Although this defect can be cured to some extent through the use of an oscillating rectifying mirror, such corrections have been found to be effective only when the inspection device is a predetermined distance from the moving web.

A further inherent disadvantage of the multi-sided type of machine is the fact that when one mirror is completing scanning and another beginning scanning, the observable image comes from portions of the web outside the normal scanning angle. In addition, the angle of the line of sight intersecting the web will be high, thus causing an apparent additional tilting of the web.

Prior attempts to overcome the cost and functional disadvantages of the multi-sided cylinder type of machine have not been successful. Mere reduction in the number of mirrors on the multi-sided cylinder is not a satisfactory solution, because it will not permit continuous scanning of the web. For example, if the number of mirrors on the cylinder were reduced to four, the scanning angle would be 180° with extremities parallel to the moving web, thus preventing continuous scanning. This same principle applies where two or less mirrors are utilized. In other types of machines, one or more mirrors are provided, but such machines have either failed to provide continuous scanning or have resulted in image distortion.

In accordance with the present invention a plurality of reflective surfaces or mirrors are moved with a compound movement in relation to a running web of material to continuously scan a running web of material. Thus the present invention includes a novel method of moving the mirrors through a compound movement so that a minimum number of mirrors, preferably only two, can be successively positioned in optical alignment between the running web and the observer and then rotated in timed relation to the running web to continuously scan or track the running web and present to the observer a succession of images which to the observer appear to be a single stationary image.

More specifically, in accordance with this invention a plurality of mirrors are revolved about a common axis so that the axes of said mirrors follow a circular path to successively move the mirrors to a position where at least one mirror will be optically aligned with an observer and the running web. Each mirror is also moved about its own axis while it is revolving about the common axis. The movement of the mirrors or reflective surfaces about their own axis is such that the mirror which is optically aligned with the observer and the running web is rotated about in timed relation to the running web so as to follow or scan the running web. The mirrors or reflective surfaces are arranged so that the mirrors are successively optically aligned with the observer and the running web so that the web is continuously scanned.

Thus the present invention provides a method for moving the mirrors with a compound movement, unlike the single movement of prior art inspection devices, so that a relatively few mirrors can achieve results, i.e. continuous scanning, which heretofore required at least fifteen mirrors or reflective surfaces.

In accordance with one embodiment of this invention a pair of mirrors are mounted for revolution on diametrically opposite sides of a first axis and are moved about their own axis so that the mirrors are successively positioned in optical aligned with the running web and the observer and when optically aligned with the running web and the observer are rotated in the same direction and in timed relation with the running web to present to the observer a series of apparently stationary images of the web.

As will become more apparent as the description proceeds the mirrors have, in effect, motions somewhat similar to that of a seat on a ferris wheel except that in accordance with the present invention at least a portion of the mirror movement is strictly controlled, i.e. when the mirror is scanning.

The mirrors, as aforesaid, are positioned so as to receive images from the running web and reflect them to an observer. For the purpose of convenience the line of direction of the image from the web to the observer is referred to as the line of reflection or line of sight.

For the sake of brevity the position of a mirror when positioned so as to reflect the web to the observer is sometimes referred to herein as a position of optical alignment between the observer and the web.

By virtue of the novel constructional arrangement of and method of moving the mirrors, the reflective surfaces of the mirrors always face in the same general direction. More specifically, the reflective surfaces of the mirrors always face the quadrant formed between the observer and the image of the web. As embodied, the mirrors oscillate about their respective axes through an angle considerably less than 360°, and more particularly, through an angle approximately equal to one half of the scanning angle. As noted above, a portion of the movement of the mirrors about their own axes is rotation movement in timed relation to the running web so that the mirrors can scan or track the running web. The other portion of the movement of the mirrors about their own axes is to return the reflective surface to a position to start the scanning movement.

The foregoing arrangement for moving the mirrors, i.e. small oscillatory movement about their respective axes, is an important feature of the present invention in that it constitutes a practical arrangement for moving the mirrors without causing excessive vibrations. If, for example, the mirrors rotated 360° about their own axes, excessive vibration would result so that accurate inspection would be impossible. Furthermore, as a practical matter, it is impossible for the mirrors to rotate about their own axes 360° and still be in the proper position for continuous scanning of the running web.

In the preferred embodiment of this invention, a pair of mirrors are mounted on common members inside a stationary frame on diametrically opposite sides of a first axis. The mirrors are mounted so that each of them will revolve together about this first axis. Each mirror is mounted on its own axis, which axis extends through opposite sides of the frame. Mounted wholly outside the frame is a drive means for causing rotation of the mirrors about the first axis, and a drive means for causing movement of each mirror independently of the other about its respective axis, which movement includes a rotary motion about its own axis in timed relation to and in the same direction as the running web of material to be inspected. By virtue of the fact that the drive means are located on the outside of the frame with the mirrors being mounted on shafts extending through the frame, the motion of the two mirrors can be controlled by positive action at all times.

It will be appreciated by those skilled in the art and will become apparent as the description proceeds that the present invention has many advantages over and above those devices previously described or alluded to.

In view of the novel mounting arrangement for the scanning mirrors, the present invention has the advantages of reducing the cost of the machine, through reduction in the number of mirrors, and reducing the manufacturing costs of the machine. Thus, by virtue of the novel arrangement and movement of the mirrors only two scanning mirrors are required. The manufacturing costs are reduced, because the path of the mirrors must be accurately controlled only when the mirrors are in the line of reflection between the observer and the web, since erratic movement of the mirror, when it is no so positioned, will not affect the image reflected to the observer.

Another advantage of the present invention is that the device can be constructed and arranged so that image overlap, which occurs when one mirror is ending and the other beginning its scanning movement, can take place inside of rather than outside of the scanning angle. This occurs because the reflective surfaces of the mirrors have, in effect, a concave, rather than convex relationship during that short interval of time when both mirrors are scanning. Thus, the present invention permits the construction of a more compact and efficient device.

The present invention described briefly and generally above, is a marked improvement over prior methods and devices in view of its simplicity and excellent inspection results. This form of the invention is most useful when the user is only interested in inspecting webs having the same lengths of pattern thereon. It will be appreciated, however, that many users will want to have one inspection apparatus which will inspect running webs, which webs have patterns of different lengths thereon.

Accordingly, in another form of the invention, a method and means are provided for permitting webs having different length patterns thereon to be inspected. In order that an inspection apparatus can inspect webs having different length patterns thereon, the lines of sight intersecting the moving web must intersect equal distances of the web in timed relation to each other and these equal distances must be maintained when the length of pattern is changed. The foregoing objective can be achieved through the use of an oscillating reflective surface in several ways. As embodied herein in one form, this means comprises two movable reflecting mirrors intermediate the scanning mirrors and the web which reflect the lines of sight along lines which intersect the moving web at equal intervals regardless of what length of web pattern is being viewed.

In another form of the invention a single oscillating mirror is located between the observer and the scanning mirrors to reflect the lines of sight so that the lines of sight from the scanning mirrors to the web intersect the web at equal intervals regardless of what length of web pattern is being inspected.

The invention consists in the novel parts, steps, constructions, arrangements, combinations and improvements shown and described.

In view of the foregoing, it is an object of this invention to provide an improved method for permitting continuous observation and inspection of a moving web of material.

Another object of this invention is to provide a new and improved device for continuous scanning of a running web of material.

A further object of this invention is to provide an improved method and apparatus having only two mirrors for permitting continuous observation and inspection of a moving web having repetitious impressions thereon regardless of the length of the impression thereon.

Another object of this invention is to provide an improved inspection apparatus which continuously scans a moving web having only two mirors which orbit about a common axis so that at least one miror is always in the line of reflection between the observer and the web and said one mirror being rotated about its own axis in the same direction as and in timed relation to the running web.

A still further object of this invention is to provide an improved method of and apparatus for continuously scanning a moving web having only two scanning mirrors which continuously scan the moving web and cooperate with an oscillating reflecting surface so that the lines of sight intersect the moving web at equally spaced apart distances regardless of the distance between the apparatus and the web.

Another object of this invention is to provide an improved method of an inspection apparatus, utilizing only two scanning mirrors for continuous inspection of successive patterns on a moving web and having means for permitting inspection of webs having different lengths of patterns thereon.

A still further object of this invention is to provide an improved inspection apparatus, having only two scanning mirrors which revolve about a common axis to successively position at least one mirror in optical alignment with the observer and the web and wherein the individual mirrors when optically aligned rotate about their own axis in the same direction as and in timed relation to the running web so as to scan the web wherein means are provided whereby the lines of sight intersect the web at equally spaced apart distances regardless of the distance between the apparatus and the web.

A still further object of this invention is to provide a method of visually inspecting a running web of material while it is moving along essentially a straight line wherein a plurality of mirrors are revolved about a first axis to position at least one mirror in optical alignment with the observer and the web and then rotating such mirror in timed relation to the running web to present to the observer a succession of images which to the observer appear to be stationary.

Additional objects and advantages of the invention will be set forth in the description which follows and in part will be obvious from the description or may be learned from practice of the invention, the objects and advantages being realized and attained by means of the steps or instrumentalities and combinations particularly pointed out in the appended claims.

The accompanying drawings which are incorporated in and constitute a part of this specification illustrate an embodiment of the invention, and together with the description serve to explain the principles of the invention.

It is to be understood that both the foregoing general description and the following detailed description are exemplary but are not restrictive of the invention. More particularly, although the present invention is described in conjunction with a printed web of material, it is clear that the invention is not restricted to inspecting printed material and is usable for inspecting moving webs or moving material in general.

Figure 1:
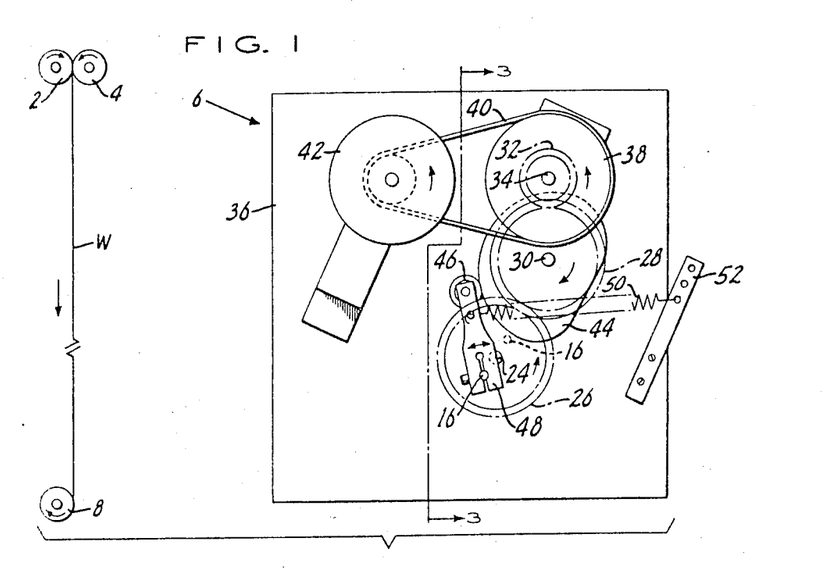
FIGURE 1 is a side elevation view of the present invention.
Figure 2:
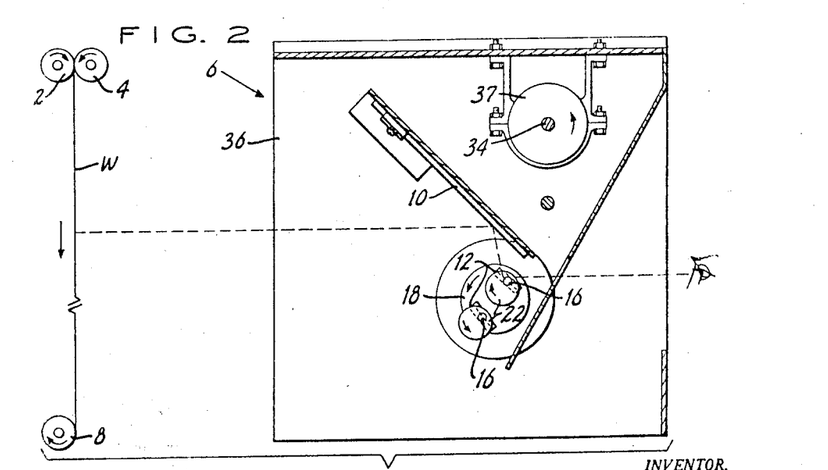
FIGURE 2 is a view taken along line 2—2 of FIGURE 3.

With reference to FIGURES 1 and 2, it can be seen that the present invention is used in combination with a running web of material W which has impressions or repetitious patterns placed thereon by printing cylinder 2 and impression cylinder 4. After passing the inspection device 6, the moving web of material is wrapped around a take-up roll 8.

Generally speaking, in accordance with the invention, means are provided for permitting continuous inspection of a running web by presenting a fixed image to an observer. As embodied, this means comprises a fixed reflecting mirror 10 which receives images directly from the moving web and reflects these images to one of the two scanning mirrors 12. The scanning mirrors are constructed and arranged so that an impression on the moving web will be scanned or tracked by one of the scanning mirrors rotating in timed relation to the running web so that the image of the impression will be stationary to the observer. The operation is continuous in that the successive repetitious impressions will be followed by the mirrors, thereby presenting to the observer a series of optically "stopped" images. To the naked eye, however, it appears to the observer that a single stationary image is being presented.

In accordance with this invention a pair of mirrors having reflective surfaces are constructed and arranged so as to continuously scan a running web of material to present a series of apparently stationary images to an observer.

Figure 3:
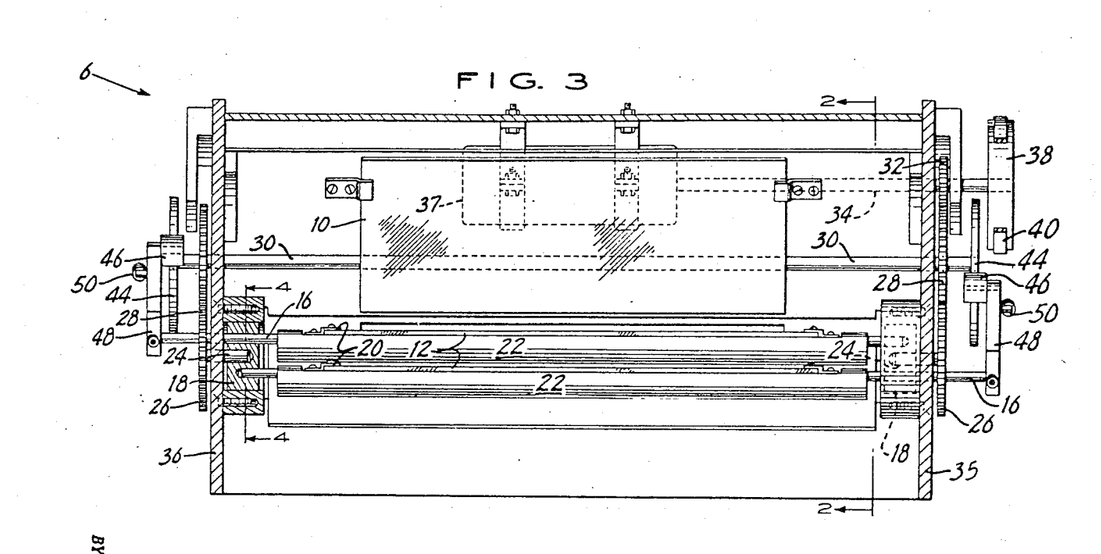
FIGURE 3 is a view taken along line 3—3 of FIGURE 1.
Figure 4:
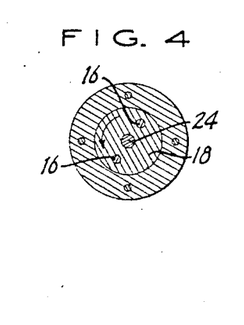
FIGURE 4 is a view taken along line 4—4 of FIGURE 3.

As embodied herein, this means includes a pair of mirror shafts 16 which are rotatably mounted on diametrically opposite sides of the axis 24 of drums 18 (FIGURES 3 and 4). The mirrors 12 which are of the strip type, as best seen in FIGURE 3, are attached by clamps 20 to the mirror holders 22, which are attached to mirror shafts 16 in a conventional manner.

The mirrors are mounted so that they can revolve together about a first axis. As embodied herein, drum 18 is fixed to the stub shaft 24 extending through the frame sides 35 and 36. A gear 26 mounted on the free end of shaft 24 on the outside of frame 35, 36. The gear 26 is driven by gear 28 on shaft 30. The shaft 30 extends between the frame sides 35, 36 and gear 28 is driven by pinion gear 32 on drive shaft 34. Mounted between the frame sides 35, 36 and in driving relationship with the drive shaft 34 is a conventional selsyn motor 37 for rotating drive shaft 34 in timed relationship to the moving web. Alternatively, conventional means may be used in lieu of the selsyn motor to operatively connect the drive shaft 34 or shaft 30 to the means driving running web W so that the shaft 34 is driven in timed relation to the running web. In order to prevent hunting and drifting of the selsyn motor, the drive shaft 34 is provided with a fly-wheel 38 and a belt 40 is provided to engage a second fly-wheel 42.

It will be obvious to those skilled in the art that the above-described elements cooperate so that the mirrors 12 revolve or orbit around the stub shaft 24. This movement positions or locates the mirrors 12 so that at least one mirror (and the reflecting surface thereof) is in the line of reflection between the web and the observer.

In accordance with this invention the mirrors are also rotated for a short period of time in the same direction as and in timed relation to the running web. This motion is accomplished by cam means located outside the frame sides 35, 36. As embodied herein, this means comprises a cam 44 which is fixedly secured to the shaft 30 and which is adapted to engage a follower 46 on the crank arm 48. The crank arm 48 is fixedly clamped to mirror shaft 16 in any conventional fashion so that movement of the crank arm 48 will result in movement of the mirror shaft 16. In order to maintain the cam follower 46 in operative relationship with the cam 44, an adjustable tension spring 50 is provided intermediate the crank arm 48 and a bracket 52 on the frame 36. It will be understood that the above-described means for causing scanning or tracking movement is duplicated for the other scanning mirror 12 on the opposite side of the assembly as illustrated in the drawings.

The mechanical construction described above is an important feature of this invention in that the drive means for the mirrors is located outside the frame and the shafts for the drum and mirrors extend outside the frame, permitting internal control of the mirrors.

The inspection method and the compound movement of the mirrors will be more fully understood with reference to the operation of the inspection device.

OPERATION

In FIGURES 5–12 there is shown schematically one complete scanning and positioning movement of the mirrors 12. In these figures it will be understood that W represents the moving web and that A represents the observer. The dotted lines shown on the drawings represent the line of reflection between the observer and the moving web at equal time intervals during the passage of one pattern length.

Figure 5:
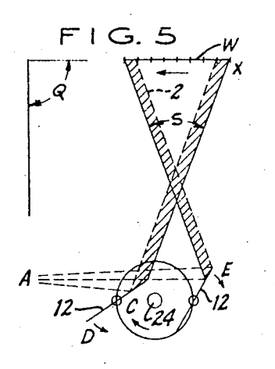
FIGURES 5-12 are schematic views showing the principle of and method of operation of the present invention.
Figure 6:
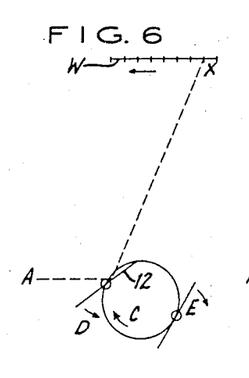
Figure 7:
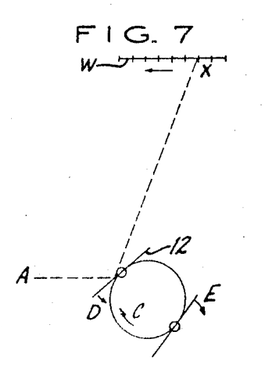
Figure 8:
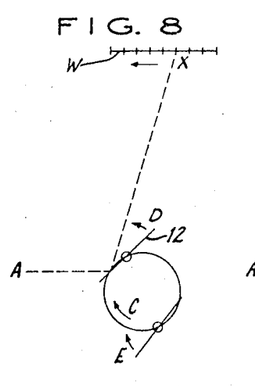
Figure 9:
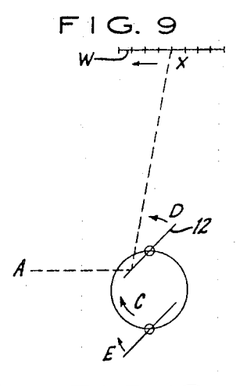
Figure 10:
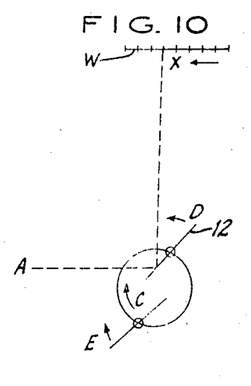
Figure 11:
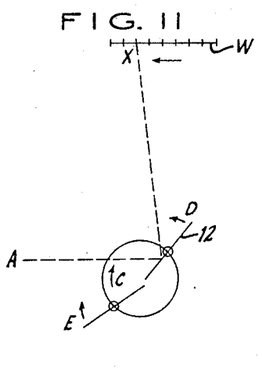

It will be observed that FIGURE 5 shows that mirrors have been positioned by the revolution of the drum 18 so that both mirrors 12 are in the line of reflection between the observer and the web. As the arrow C designates, the mirrors 12 are revolving about their common axis, i.e., stub shaft 24, in a clockwise direction so that one mirror is always optically aligned with the observer and the web and the scanning mirrors 12 successively follow one another to this position.

The mirror which is in the line of reflection is the scanning or tracking mirror and this mirror is rotating about its own axis i.e. shafts 16 (shown by arrow D) in the same direction that the web W is moving. The rotation of the mirror 12 which is in the line of reflection is in the same direction as and in timed relationship to the running web so that an observer at position A sees a stationary image.

Figure 12:
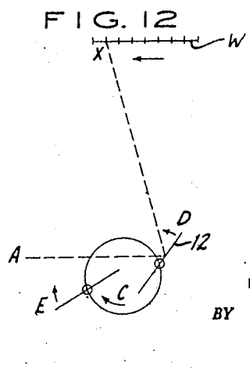
Figure 13:
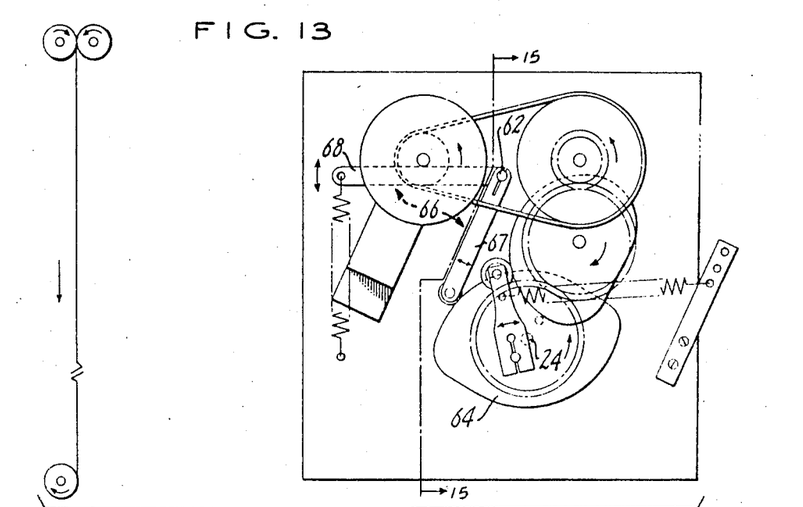
FIGURE 13 is a side elevational view of a form of the invention modified from that shown in FIGURES 1-12.
Figure 14:
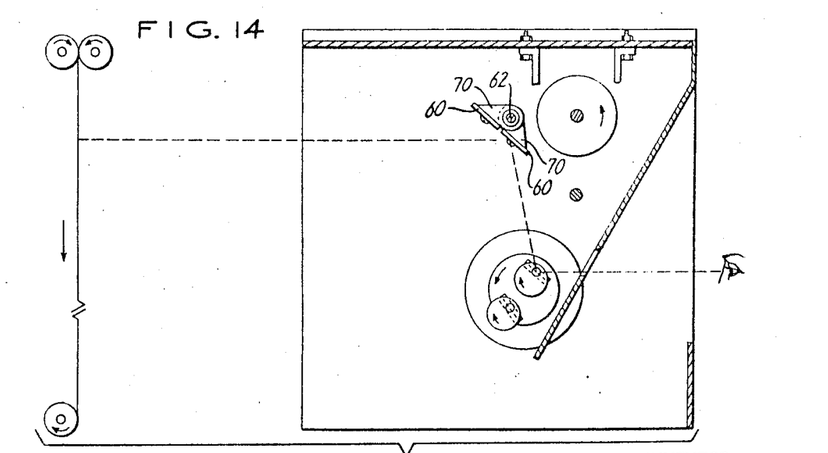
FIGURE 14 is a view taken along line 13—13 of FIGURE 20.

The complete scanning or tracking movement can be seen in FIGURES 5–12 where it is shown in successive stages that an area X on the moving web is followed by the scanning mirror 12, which, as shown by arrow D, is moving in the same direction as and in timed relation to the moving web W. The mirrors 12 are located a distance from the running web which permits observation of one complete impression or pattern on the printed web. The last stage of the scanning operation is shown in FIGURE 12, where it can be seen that one mirror 12 is finishing its scanning operation, whereas the other mirror is about to begin scanning or tracking.

The mirrors 12, it can be seen from the drawings, never face away from the web and always face the quadrant Q formed between the observer and the web. More particularly, the mirrors 12 angularly oscillate about their own axis through an angle approximately equal to the scanning angle designated S in FIGURE 5. Hence the movement of a mirror required to return it to the appropriate position for scanning is quite small so that undesirable vibration does not occur. For example, if the mirrors 12 rotated 360° about their own axes, substantial vibration would result so that the quality of inspection would be quite poor.

Figure 15:
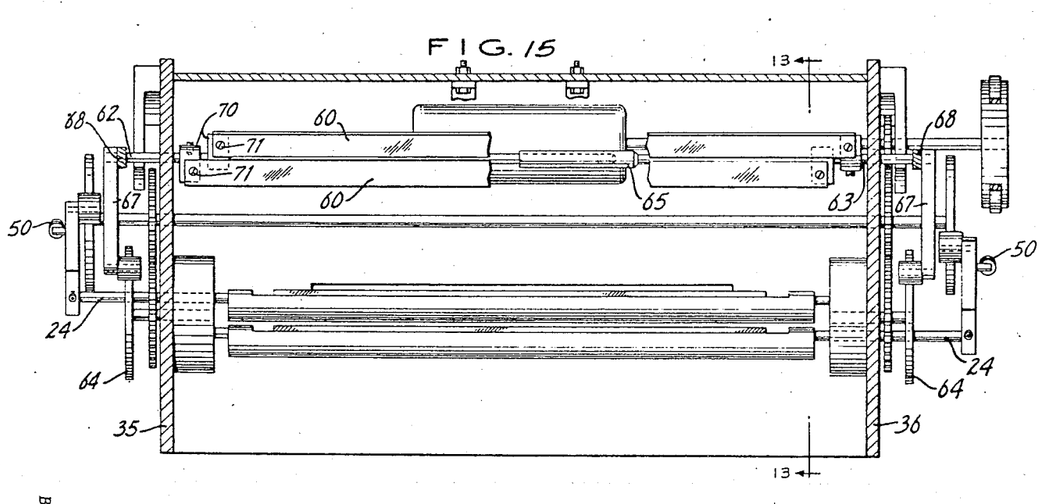
FIGURE 15 is a view taken along line 15—15 of FIGURE 13.
Figure 16:
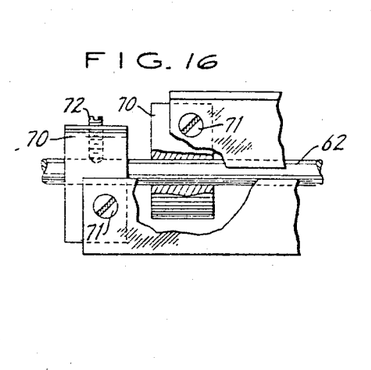
FIGURE 16 is an enlarged partial view showing one of the details of this form of the invention.

Hence when one of the mirrors 12 is not scanning the web W, such mirror is positioned or aimed by its revolving and oscillating movement so that it can begin scanning when the other mirror finishes scanning. Thus, in the embodiment of the invention shown in FIGURES 1–12, the mirror which is not actually scanning but which is being positioned is moving on its individual axis in an opposite direction from the scanning mirror, as shown by arrow E. In short, the scanning mirror is rotating in a counterclock-wise direction with respect to its own axis, whereas the non-scanning mirror is rotating in a clockwise direction with respect to its axis. These differences of movement, however, have no deleterious effect on the operation of the device, since it is only the mirror which is scanning the web whose movement must be accurately and completely controlled. It will be understood, of course, that between FIGURES 12 and 15 the positioning mirror will change its direction from arrow E to arrow D. It will be understood, further, that the particular directions of movement, i.e. clock-wise or counterclockwise, are not significant except during scanning. It is important, however, for the reasons stated, that the amount of actual angular movement of the mirrors 12 be relatively small and in the order of one half the scanning angle.

The process of the present invention includes feeding a web of material to be inspected along a substantially straight line, revolving at least two mirrors together about a common axis so that at least one mirror is always optically aligned with the web and the observer and rotating the mirror which is optically aligned between the observer and the web in timed relation to the running web to present to the observer a series of images which to the observer appear to be stationary.

One of the inherent advantages of this invention is that it can provide a method and a mechanism which permits image overlap within the scanning angle. In the multi-sided cylinder type of inspection apparatus, owing to the convex relationship of the mirrors relative to the observer, image overlap can occur only outside of the scanning angle. However, with the present invention the mechanism can be constructed and arranged so that the relationship between the observer and the mirrors is concave, as shown in FIGURE 5, when one mirror is ending and the other mirror is beginning scanning movement and the image seen by the observer is within the scanning angle, as shown by the area designated 2.

The advantage of having the image overlap occur within, rather than without, the scanning angle is that the space outside of the area bounded by the scanning angle can be used for another purpose, e.g., lights, or to provide a narrower more compact device. Another advantage of this feature is the small angle of the line of reflection between the web and the device which substantially reduces what is known as the tilting effect thereby resulting.

An important feature of the apparatus is the location of the actuating means for the drums and the mirrors outside the frame. This arrangement permits full and accurate control of the mirrors by the cam means so that there is positive control over the movement of the mirrors throughout their movement.

It will be understood that it is a desideratum that a user be able to use the same inspection apparatus to inspect different webs wherein the webs have different length patterns thereon. In order to accomplish this result, it is necessary that the lines of sight interesect equal length intervals of the web for equal time intervals within a single scanning motion and that this be accomplished regardless of the distance between the inspection apparatus and the web.

In order to accomplish this result it is necessary that the lines of sight intersecting the web pass through a common point so that the lines of sight intersect equally spaced apart distances along the web. Ordinally, the lines of sight do not form a fan of lines passing through a common point which intersect equally spaced apart distances on the web.

In accordance with this invention the lines of sight are directed or oriented to intersect equally spaced apart distances on the web so that different length patterns, which may be printed on the web, can be inspected. This result is accomplished through the use of an oscillating mirror surface as more fully described below.

Accordingly, a modified version of the present invention includes a method and means for permitting the inspection device to continuously inspect patterns on a moving web of material regardless of the length of the patterns on the running web. The details of one form of this means are illustrated in FIGURES 13–16 and the principle of operation is shown in FIGURES 17–21. In order to simplify the drawings thereof, FIGURES 13–16 include only sufficient reference numerals to describe the modified version of the invention, since FIGURES 13–16 are otherwise identical to FIGURES 1–3.

In accordance with the modified form of this invention, a method and means is provided for reflecting the image of the web along lines which intersect equally spaced apart distances along the web regardless of the distance between the device and the web. This means, as embodied herein, include a pair of reflecting mirrors 60 which are mounted between the sides 35, 36 of the frame for oscillatory movement and are located intermediate the scanning mirrors 12 and the running web.

Figure 18:
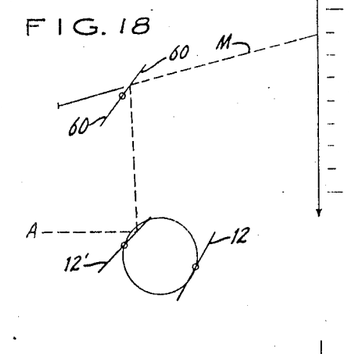
Figure 19:
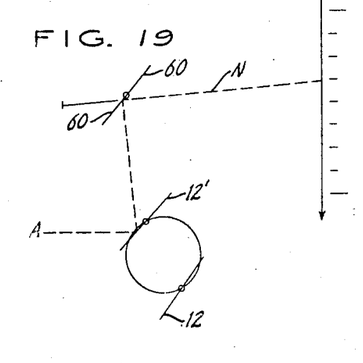
Figure 20:
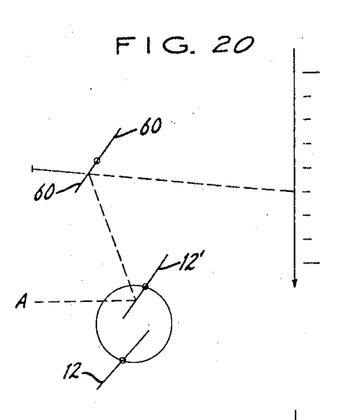
Figure 21:
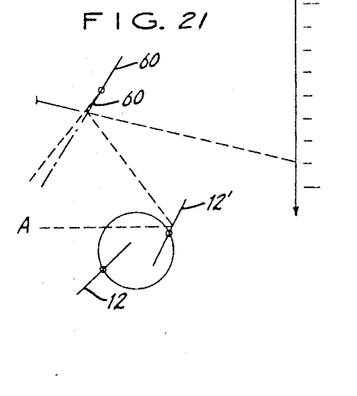

As shown in FIGURES 13–16, the reflecting mirrors 60 are mounted on shafts 62, 63 which is in the form of a split shaft so that one shaft can move without reference to the other shaft. As embodied, the shaft 63 is provided with an enlarged portion 65 having an aperture for receipt of the end of shaft 62. Means are provided for each shaft for oscillating them and, since the means is similar for each shaft, only one means will be described in detail. In FIGURES 18 and 20, a cam 64 is shown as being fixedly attached to the stub shaft 24 so as to rotate therewith when shaft 24 is rotated by the means previously described. The cam 64 is adapted to engage the bell cranked shaped cam follower 66 which is fixedly attached to the shaft 62. In order to hold the leg 67 of the cam follower 66 in engagement with cam 64 a spring 69 has one end attached to the other leg 68 of the cam follower and the other end of spring 69 is attached to the frame. Thus, in response to rotation of the stub shaft 24, the reflecting mirrors 60 will be oscillated according to the shape of cam 64.

Means are provided for attaching the mirrors 60 to the shafts 62, 63 so that the mirrors will rotate therewith. As embodied, each end of the mirrors 60 is provided with a block 70 fixed to each mirror by any conventional means such as screws 71. The blocks 70 have an aperture therein for receipt of the shafts 62, 63. One of the blocks 70 for each mirror is locked to an associated shaft by a lock screw 72.

OPERATION

Figure 17:
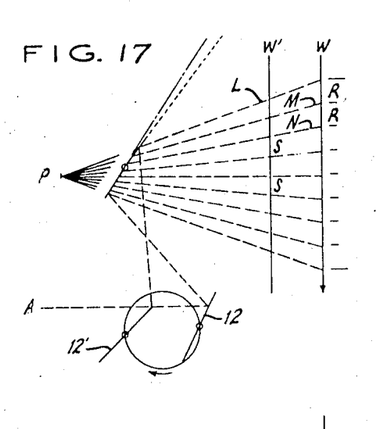
FIGURES 17-21 are schematic views illustrating the principle of and method of operation of this modified form of the invention.

The method and principle of the modified form of the invention is illustrated in FIGURE 17 where the dotted lines represent the lines of sight for the scanning of one pattern length and is a composite view of the steps shown in FIGURES 17–21. As shown in FIGURES 17–21, the reflecting mirrors 60 are in the line of reflection between the web and the observer and these movable reflecting mirrors take the place of the stationary mirror 10 in the form of the invention illustrated in FIGURES 1–12. The reflecting mirrors 60 are oscillated by the above-described means so that these mirrors not only reflect the image of the web to the scanning mirrors 12 but in addition thereto, owing to the oscillation of the reflecting mirrors 60, reflect the image of the web along lines which converge towards a single point P.

In order that the lines of sight will intersect the web at equally spaced apart distances, regardless of the distance between the device and the web, the scanning mirror 12, which is scanning the web is aimed at the reflecting mirror 60, and the position of the mirror 60 is adjusted to direct the line of sight along predetermined lines. The predetermined lines, FIGURE 17, emanate from a common point so that no matter what the distance is between the device and the web, these lines will intersect the web at equally spaced apart distances. Thus, as shown in FIGURE 17, the distances R which represent the distance between where the lines of sight intersect web W are equal. Similarly, the distances S which represent the distance between where the lines of sight intersect the web W', are equal.

In FIGURES 17 to 21 a complete cycle of operation is schematically illustrated.

In FIGURE 17 one of the scanning mirrors 12 is beginning its scanning movement and one of the reflecting mirrors 60 is in the line of reflection between the observer A and the web W so as to direct the image along line L. When the mirror has moved to the position shown in FIGURE 18, the reflecting mirror 60 directs the image along line M (see FIGURES 17 and 18). By the time mirror 12 has reached the FIGURE 19 position, the line of reflection from the web to the device is along line N. The process continues in like manner as shown in FIGURES 25 and 26, and in FIGURE 21 it can be seen that the one scanning mirror 12 is moving out of the line of reflection and other scanning mirror 12 is moving into the line of reflection.

By reason of this arrangement, the entire device can be moved towards and away from the running web by any conventional means. The distance between the web and the device is determined by the length of the pattern and the same machine can be used to inspect different webs having different length patterns thereon.

Figure 22:
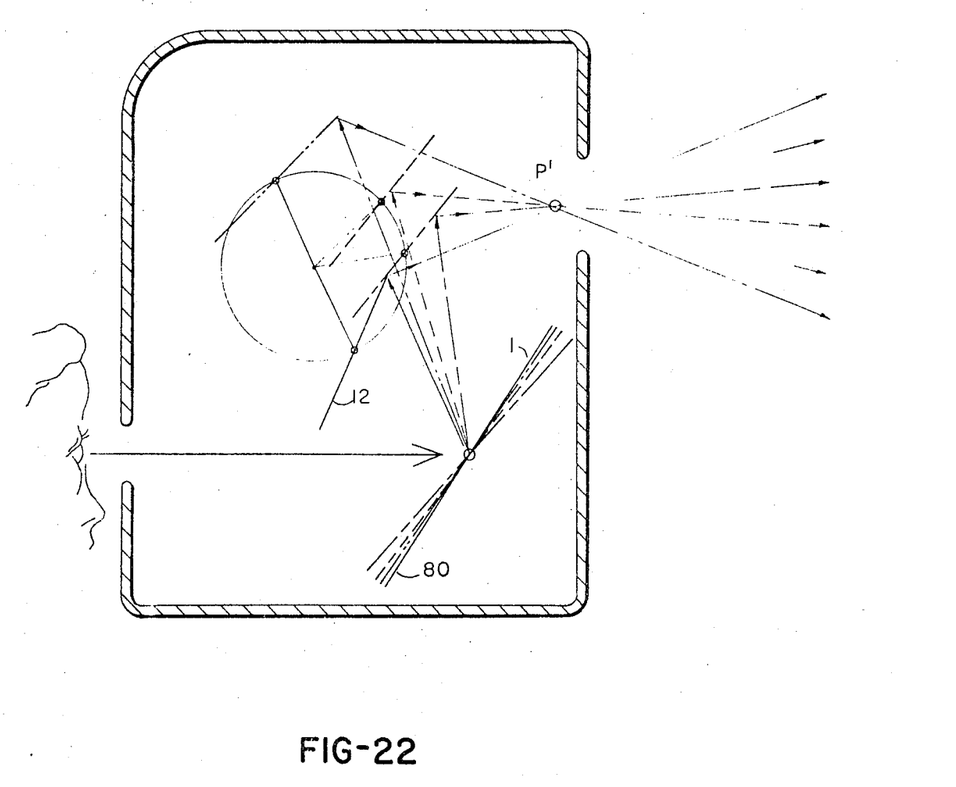
FIGURE 22 is a view illustrating another modified form of the invention.

Another and somewhat simplified manner of re-orienting the lines of sight is illustrated in FIGURE 22. For convenience of description, identical reference numerals are used to identify identical elements described in reference to the preceding figures.

In this form of the invention, a single reflecting mirror or surface 80 is mounted on a shaft 82 intermediate the observer and the scanning mirrors 12, as shown in FIGURE 2. The mirror or reflective surface 80 is attached to the shaft 82 in any convenient manner such as shown in connection with one of mirrors 60 and shaft 62. The purpose of the mirror or reflective surface 80 is to aim at the scanning mirrors 12 so that the lines of sight or reflection between the observer and the web will pass through the point P' as shown in FIGURE 22. To accomplish this result, the mirror 80 is oscillated through a very small angle to aim at the mirror 12 which is scanning, so that the lines of reflection from the scanning mirror to the running web will all pass through point P' and will intersect the web W at equally spaced apart distances throughout its length. The mirror 80 can be oscillated by any convenient structure such as, for example, the cam means used in connection with the mirrors 60. The cam means obviously is coordinated with the movement of the mirrors 12 so that the lines of sight will be oriented to pass through point P'.

FIGURE 22 illustrates schematically the manner in which the single reflecting mirror 80, positioned between the observer and the web, can redirect or orient the lines of sight as aforesaid. Thus, FIGURE 22 shows the scanning mirror 12 (the other mirror 12 is not scanning at this time) in various positions during its scanning movement. For ease of understanding, only a few positions are illustrated. Thus, when mirror 12 is in the full line 1, the mirror 80 is in the full line 1, so that the line of sight passes through point P'. When the scanning mirror 12 has moved to the phantom line position, then the mirror 80 is in the phantom line position, so that the line of sight passes through point P'. The same is true with respect to dotted line position and the dash dot position of the scanning mirror 12 on the mirror 80. It will be understood, however, that this is a continuous operation, with the positions of scanning mirror 12 and oscillating mirror 80 constantly changing. As can be seen in FIGURE 22, the lines of sight intersect equal distances of the web as in the case of FIGURES 13–21.

It is to be understood that the invention in its broader aspects is not limited to the specific elements and steps shown and described, but also includes within the scope of the accompanying claims any departures made from such elements or steps which do not sacrifice its chief advantages.

What is claimed is:
1. A method of visually inspecting a running web of material with two or more mirrors comprising:
 (a) feeding a web of material continuously along a predetermined line,
 (b) revolving a plurality of mirrors having reflective surfaces thereon about a common axis so that at least one mirror is adapted to be optically aligned between the observer and the web,
 (c) positioning said mirrors while they are revolving so that the reflective surface of at least one of said mirrors is always optically aligned between the observer and the web,
 (d) controlling the revolving and positioning movements of said reflective surfaces so that the reflective surfaces are sucessively optically aligned between the observer and the web one after the other,
 (e) rotating the mirror which is optically aligned between the observer and the web about a second axis in timed relation to the running web so that the entire web is scanned by said reflective surfaces to present to the observer a succession of images which to the observer appear to be a single stationary image,
 (f) limiting the movement of said mirrors during their positioning and rotating movements so that the reflective surfaces of said mirrors always face in the same general direction throughout their revolving movement about said common axis.

2. A method as defined in claim 1 including orienting the lines of reflection so that the lines of reflection all pass through a single stationary point and intersect the web at equally spaced apart distances to permit inspection of webs having different length patterns thereon.

3. A method as defined in claim 1 utilizing only two reflective surfaces which are continuously located on opposite sides of said first axis.

4. The method as defined in claim 3 including the step controlling the revolving and positioning movements of the reflective surfaces so that the reflective surfaces are successively optically aligned between the observer and the web one after the other and so that when one reflective surface is moving out of optical alignment between the observer and the web and the next reflective surface is moving into optical alignment between the observer and web both reflective surfaces are in optical alignment between the observer and the web.

5. A mechanism for use in continuously scanning a running web of material so as to present a succession of apparently stationary images to an observer, comprising:
 (a) a frame,
 (b) a pair of drums having a first axis mounted on said frame,
 (c) a pair of mirrors extending between said drums on diametrically opposite sides of said first axis,
 (d) means for revolving said mirrors together about said first axis and for positioning said mirrors so that at least one mirror is always optically aligned between the observer and the web,
 (e) means for rotating the mirror which is optically alinged between the observer and web in timed relation to the running web independently of the revolving movement so that the web is continuously scanned by at least one of said mirrors to present a stationary image to the observer,
 (f) means for limiting the movement of said mirrors so that they always face in the same general direction throughout their revolving and rotating movement.

6. A device as claimed in claim 5 wherein said first axis comprises shaft means for mounting said drums on opposite sides of said frame.

7. A device as defined in claim 6 wherein said mirrors are mounted on shaft means extending through said drums and said frame and wherein means are provided outside of said frame and wherein means are provided the mirrors are mounted.

8. A device as defined in claim 5 including reflecting surfaces mounted on said frame and means for moving said reflective surfaces to orient the lines of sight to intersect the running web at equally spaced apart distances.

9. A mechanism for inspecting a running web of material by presenting to an observer a succession of apparently stationary images of a running web comprising: a frame having spaced apart sides, a pair of drums rotatably mounted inside the sides of said frame for rotation about a first axis, a pair of mirrors mounted on said drums and extending therebetween on diametrically opposite sides of said first axis for angular oscillation about their own axis independently of said rotation about said first axis, means mounted outside of said frame for rotating said pair of mirrors about said first axis to thereby position said mirrors so that at least one mirror is always in the line of reflection between the observer and the web, and means mounted on the outside of said frame for each of said mirrors for angularly oscillating each of said mirrors about their own axis through an angle considerably less than 360°, said last mentioned means rotating the mirror which is in the line of reflection between observer and the moving web in the same direction as and in timed relation to the running web to thereby present stationary images to the observer, and a third and fourth mirror in the line of reflection between the web and said pair of mirrors, means for angularly oscillating said third and fourth mirrors to thereby reflect the image of the web along lines that emanate from an imaginary stationary point so that said lines will intersect the web at equally spaced apart distances regardless of the distance between the mechanism and the web thereby permitting scanning and inspection of webs having differnt length patterns thereon.

10. A device as defined in claim 8 wherein the said reflecting surfaces comprise mirror means mounted on a shaft connected to said frame, and including means mounted on said frame for oscillating said shaft to thereby orient the lines of slight, said mirrors being located so as to be optically aligned between the observer and the scanning mirrors.

11. A device as defined in claim 8 wherein the said reflecting surfaces comprise mirror means mounted on a shaft connected to said frame, and including means mounted on said frame for oscillating said shaft to thereby orient the lines of slight, said mirrors being located so as to be optically aligned between the scanning mirrors and the web.

References Cited

UNITED STATES PATENTS

| | | | |
|---|---|---|---|
| 1,549,750 | 8/1925 | Dole | 352—108 |
| 2,718,549 | 9/1955 | Mattke | 352—109 |

RONALD L. WIBERT, Primary Examiner

W. L. SIKES, Assistant Examiner

PO-1050
(5/69)

UNITED STATES PATENT OFFICE
CERTIFICATE OF CORRECTION

Patent No. 3,506,356      Dated April 14, 1970

Inventor(s) Horace C. Stringfield

It is certified that error appears in the above-identified patent and that said Letters Patent are hereby corrected as shown below:

Claim 7 should read:

10. (Amended) A device as defined in Claim 6 wherein said mirrors are mounted on shaft means extending through said drums and said frame and wherein means are provided outside of said frame for rotating said shafts to which the mirrors are mounted.

List of references should read:

1,994,708   3/35   Hogan   17-76
    2,155,013   4/39   Horton   88-14
    1,549,750   8/1925   Dole   352-108
    2,718,549   9/1955   Mattke   352-109

SIGNED AND
SEALED
SEP 15 1970

(SEAL)
Attest:

Edward M. Fletcher, Jr.
Attesting Officer

WILLIAM E. SCHUYLER, JR.
Commissioner of Patents